US012738872B2

(12) United States Patent
Suwa et al.

(10) Patent No.: US 12,738,872 B2
(45) Date of Patent: Sep. 15, 2026

(54) MOTOR CONTROL DEVICE AND MOTOR CONTROL METHOD

(71) Applicant: MITSUBA Corporation, Gunma (JP)

(72) Inventors: Mamoru Suwa, Gunma (JP); Daisuke Hosono, Gunma (JP); Takuya Sato, Gunma (JP); Takayuki Furuuta, Gunma (JP); Hirokazu Takada, Gunma (JP); Hiroaki Obuchi, Gunma (JP)

(73) Assignee: MITSUBA Corporation, Gunma (JP)

( * ) Notice: Subject to any disclaimer, the term of this patent is extended or adjusted under 35 U.S.C. 154(b) by 235 days.

(21) Appl. No.: 18/642,858

(22) Filed: Apr. 23, 2024

(65) Prior Publication Data

US 2025/0105772 A1 Mar. 27, 2025

(30) Foreign Application Priority Data

Sep. 25, 2023 (JP) ................................ 2023-160034

(51) Int. Cl.
*H02P 23/14* (2006.01)

(52) U.S. Cl.
CPC .................................... *H02P 23/14* (2013.01)

(58) Field of Classification Search
CPC ........ H02P 27/06; H02P 29/032; H02P 27/08; H02P 21/34; H02P 6/20; H02P 21/22; H02P 2101/45; H02P 29/02; H02P 23/00; H02P 6/08; H02P 6/12; H02P 7/06; H02P 5/46; H02P 23/0004; H02P 29/68; H02P 23/14; H02P 9/107; H02P 21/18; H02P 21/00; H02P 11/06; H02H 7/093; B60L 2240/547; B60L 15/20; B60L 2220/14; B60L 2240/421; B60L 2220/16; B60L 2240/12; B60L 2240/427; B60L 2240/429; B60L 2240/441; B60L 3/003; B60L 50/15; B60L 50/61; B60L 7/14; G01R 19/2513; B60W 10/08; B60W 10/26; B60W 2710/081; H02K 47/04
See application file for complete search history.

(56) References Cited

U.S. PATENT DOCUMENTS

2016/0233816 A1* 8/2016 Je ............................ H02M 1/32

FOREIGN PATENT DOCUMENTS

JP 2001286179 10/2001
JP 2001286179 A * 10/2001 ................ H02P 6/12

OTHER PUBLICATIONS

"Sato Toshiaki et al., Fan Motor Control Method and Its Unit, Oct. 12, 2001, Clarivate Analytics, pp. 1-46" (Year: 2001).*

* cited by examiner

*Primary Examiner* — Antony M Paul
(74) *Attorney, Agent, or Firm* — JCIPRNET

(57) ABSTRACT

A motor control device and a motor control method capable of performing power limitation of a drive circuit more accurately are provided. A motor control device for controlling a motor by supplying a drive signal generated on the basis of a rotation command value by a drive circuit to the motor includes a voltage detection part that detects a voltage of the drive signal as a load voltage, a current detection part that detects a current of the drive signal as a load current, and a power limitation part that detects a load power of the drive circuit on the basis of the load voltage and the load current, and decreases the rotation command value when the load power exceeds a predetermined upper limit value to perform power limitation.

4 Claims, 3 Drawing Sheets

MOTOR CONTROL DEVICE AND MOTOR CONTROL METHOD

CROSS-REFERENCE TO RELATED APPLICATION

This application claims the priority benefits of Japanese application no. 2023-160034, filed on Sep. 25, 2023. The entirety of the above-mentioned patent application is hereby incorporated by reference herein and made a part of this specification.

BACKGROUND

Technical Field

The disclosure relates to a motor control device and a motor control method.

Description of Related Art

Patent Document 1 (Japanese Patent Laid-Open No. 2001-286179) below discloses a fan motor control method and a fan motor control device. In this related art, load detection of an inverter main circuit is performed when a fan motor (brushless DC motor) is driven by the inverter main circuit, a command rotation speed to be output from a motor control part to the inverter main circuit is decreased when a detected load is equal to or larger than a predetermined load, and the command rotation speed is increased when the detected load is smaller than the predetermined load.

Incidentally, in the related art, the command rotation speed is decreased when an overload is detected, to thereby protect the inverter main circuit from heat, but the load detection is performed on the basis of a motor current supplied from the inverter main circuit (drive circuit) to the fan motor (control target).

That is, in the related art, it is not possible to accurately detect a load in a state where a voltage applied to the control target, that is, a motor voltage can be varied. Therefore, the related art has a problem in that it is not possible to accurately perform power limitation of the drive circuit.

The disclosure provides a motor control device and a motor control method capable of more accurately performing power limitation of a drive circuit.

SUMMARY

In the disclosure, as a first aspect related to a motor control device, a motor control device for controlling a motor by supplying a drive signal generated based on a rotation command value by a drive circuit to the motor, the motor control device including: a voltage detection part configured to detect a voltage of the drive signal as a load voltage; a current detection part configured to detect a current of the drive signal as a load current; and a power limitation part configured to detect a load power of the drive circuit based on the load voltage and the load current, and decrease the rotation command value in response to the load power exceeding a predetermined upper limit value to perform power limitation is adopted.

In the disclosure, as a second aspect related to the motor control device, the first aspect, wherein the power limitation part increases the rotation command value in response to the load power being lower than a predetermined lower limit value, is adopted.

In the disclosure, as a third aspect related to the motor control device, the first aspect, wherein the power limitation part releases the power limitation in response to the load power being lower than a predetermined release value, a host command rotation speed lower than a current command rotation speed being designated, and the load power being lower than the release value, is adopted.

In the disclosure, as a fourth aspect related to the motor control device, any one of the first to third aspect, wherein the voltage detection part detects a supply voltage supplied to the drive circuit as the load voltage, is adopted.

In the disclosure, as an aspect related to a motor control method, a motor control method for controlling a motor by supplying a drive signal generated based on a rotation command value by a drive circuit to the motor, the motor control method including: a load power detection step of detecting a load power of the drive circuit based on a load voltage and a load current of the drive circuit; and a rotation command value correction step of implementing power limitation by decreasing the rotation command value in response to the load power exceeding a predetermined upper limit value, is adopted.

According to the disclosure, it is possible to provide a motor control device and a motor control method capable of performing power limitation of a drive circuit more accurately.

DESCRIPTION OF THE EMBODIMENTS

Hereinafter, one embodiment of the disclosure will be described with reference to the drawings.

Figure 1:
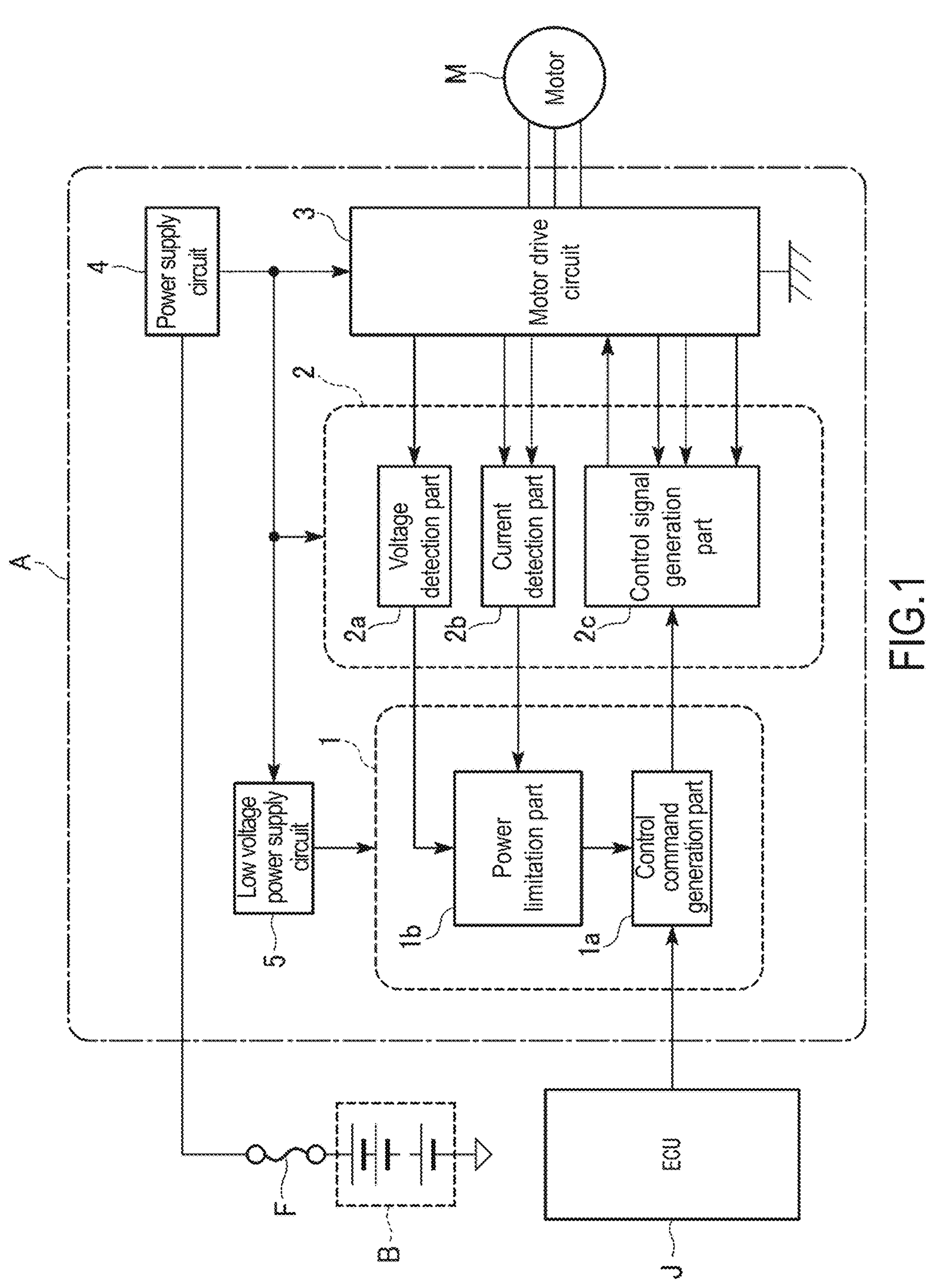
FIG. 1 is a block diagram showing a configuration of a motor control device A according to an embodiment of the disclosure.

As shown in FIG. 1, a motor control device A according to the present embodiment includes a microcomputer 1, a motor control IC 2, a motor drive circuit 3, a power supply circuit 4, and a low voltage power supply circuit 5 as functional components.

This motor control device A is a vehicle control device mounted on a vehicle, and operates on the basis of a battery power supplied from a battery B also mounted on the vehicle. This motor control device A is supplied with the battery power which is an output of the battery B via a fuse F as shown in the figure.

Further, the motor control device A is an in-vehicle motor control device that controls a motor M under the control of a host control device J (ECU) mounted on the vehicle. The host control device J comprehensively controls the motor control device A, which is a component of the vehicle, along with other components by outputting a host control command value to the motor control device A. The host control command value is, for example, a host command rotation speed R0 indicating the rotation target value of the motor M.

As shown in the figure, the microcomputer 1 includes a control command generation part 1*a* and a power limitation part 1*b* as functional components. The microcomputer 1 includes a storage part, a computing part, and an input and output part as hardware components.

In the microcomputer 1, when the calculation part executes a motor control program stored in the storage part in advance, the input and output part generates a command rotation speed Ra (rotation command value) corresponding to the host command rotation speed R0 (host control command value) received from the host control device J (ECU), and outputs the command rotation speed Ra to the motor control IC 2 via the input/output part.

The control command generation part 1*a* is a functional component that performs the main function of the microcomputer 1 described above, that is, a function of generating the command rotation speed Ra (rotation command value). That is, this control command generation part 1*a* uses the host command rotation speed R0 as a main input signal to generate the command rotation speed Ra corresponding to the host command rotation speed R0, and outputs the command rotation speed Ra to the motor control IC 2.

Further, the control command generation part 1*a* performs correction into the command rotation speed Ra according to content of the power limitation signal (power limitation content) when a power limitation signal is input from the power limitation part 1*b*. This power limitation content includes a) reducing the load power of the motor drive circuit 3 by decreasing the command rotation speed Ra, b) increasing the load power of the motor drive circuit 3 by increasing the command rotation speed Ra, and c) maintaining the load power of the motor drive circuit 3 at a current value by maintaining the command rotation speed Ra at the current value.

The power limitation part 1*b* is a functional component that performs a sub-function of the microcomputer 1, that is, a function of limiting power consumption in the motor drive circuit 3, for the control command generation part 1*a*. That is, the power limitation part 1*b* decreases or increases the rotation command value of the control command generation part 1*a* on the basis of a load voltage and a load current of the motor drive circuit 3 input from the motor drive circuit 3 via the motor control IC 2.

Although details will be described later, the power limitation part 1*b* calculates the load power Wa of the motor drive circuit 3 as a drive load on the basis of the load voltage and the load current of the motor drive circuit 3. This power limitation part 1*b* generates the above-described power limitation signal by comparing the load power Wa (driving load) with power limitation threshold values such as an upper limit value WH, a release value WK, and a lower limit value WL.

Further, the power limitation part 1*b* outputs the power limitation signal to the control command generation part 1*a* so that the command rotation speed Ra is corrected. Since the command rotation speed Ra is corrected on the basis of the power limitation signal, the load power of the motor drive circuit 3 functioning as a power conversion circuit eventually changes. That is, the power limitation part 1*b* is a subject of the power limitation control of the motor drive circuit 3, which is executed as the sub-function by the microcomputer 1.

As shown in the figure, the motor control IC 2 includes a voltage detection part 2*a*, a current detection part 2*b*, and a control signal generation part 2*c* as functional components. The motor control IC 2 is an integrated circuit (IC) that includes a plurality of input terminals and a plurality of output terminals as hardware components.

In such a motor control IC 2, the voltage detection part 2*a* has an input terminal connected to a power supply terminal of the motor drive circuit 3, and detects a supply voltage of the motor drive circuit 3 as a load voltage at the time of generating the drive signal. This voltage detection part 2*a* outputs such a load voltage (the supply voltage) to the power limitation part 1*b* of the microcomputer 1.

The current detection part 2*b* has a pair of input terminals connected to both terminals of a shunt resistor provided in the motor drive circuit 3. That is, one of the input terminals of the current detection part 2*b* is connected to one terminal of the shunt resistor, and the other input terminal is connected to the other terminal of the shunt resistor.

Such a current detection part 2*b* detects a drive current flowing to the motor drive circuit 3 and the motor M as the load current of the motor drive circuit 3 on the basis of a current flowing to the motor drive circuit 3 via the motor M, that is, the drive signal generated to the motor M by the motor drive circuit 3. This current detection part 2*b* outputs the load current of the motor drive circuit 3 to the power limitation part 1*b* of the microcomputer 1.

The control signal generation part 2*c* is a functional component that performs the main function of the motor control IC 2, that is, a function of generating a drive control signal. The control signal generation part 2*c* generates the drive control signal on the basis of the rotation command value input from the control command generation part 1*a* of the microcomputer 1 and the waveform of the drive signal input from the motor drive circuit 3. The control signal generation part 2*c* outputs such a drive control signal to the motor drive circuit 3.

The motor drive circuit 3 is a drive signal generation circuit that generates a drive signal to be supplied to the motor M on the basis of the drive control signal input from the motor control IC 2. This motor drive circuit 3 is a type of power conversion circuit, and converts a supply power (DC power) supplied from the power supply circuit 4 into a drive signal (AC power) on the basis of the drive control signal.

Such a motor drive circuit 3 is typically a three-phase inverter circuit. That is, this motor drive circuit 3 includes a U-phase switching leg, a V-phase switching leg, and a W-phase switching leg which are connected in parallel to the power supply circuit 4. The U-phase switching leg, the V-phase switching leg, and the W-phase switching leg each include an upper arm switching transistor and a lower arm switching transistor.

That is, the U-phase switching leg, the V-phase switching leg, and the W-phase switching leg are each switching circuits in which the upper arm switching transistor and the lower arm switching transistor are connected in series. The motor drive circuit 3 also includes a shunt resistor connected in series to the U-phase switching leg, the V-phase switching leg, and the W-phase switching leg.

Further, when the motor drive circuit 3 is configured as a three-phase inverter circuit, the drive control signal is typically a pulse width modulation (PWM) signal. That is, the control signal generation part 2*c* of the motor control IC 2 is a pulse signal for turning ON (conduction)/OFF (non-conduction) three upper arm switching transistors and three lower arm switching transistors in the U-phase switching leg, V-phase switching leg, and W-phase switching leg.

The power supply circuit 4 has an input terminal connected to the other terminal of the fuse F, and transforms battery power supplied from the battery B via the fuse F. This power supply circuit 4 has an output terminal connected to a power supply terminal of the motor control IC 2 and an input terminal of the motor drive circuit 3, and supplies a supply power obtained by transforming the battery power to the motor control IC 2 and the motor drive circuit 3.

The low voltage power supply circuit 5 has an input terminal connected to an output terminal of the power supply circuit 4, and decreases the supply power input from the power supply circuit 4 to a voltage according to a specification of the microcomputer 1. This low voltage power supply circuit 5 has an output terminal connected to a power supply terminal of the microcomputer 1, and supplies a low supply voltage obtained by decreasing a supply power to the microcomputer 1.

Next, an operation of main parts of the motor control device A according to the present embodiment, that is, the motor control method according to the present embodiment will be described in detail with reference to FIGS. 2, 3A, and 3B.

A main operation of the motor control device A will be described prior to description of the operation of the main parts of the motor control device A. In this motor control device A, the host command rotation speed R0 (host control command value) corresponding to a state of the vehicle is sequentially input from the host control device J. In this motor control device A, the control command generation part 1*a* of the microcomputer 1 generates the command rotation speed Ra (rotation command value) according to the host command rotation speed R0 and outputs the command rotation speed Ra to the control signal generation part 2*c* of the motor control IC 2.

The control signal generation part 2*c* of the motor control IC 2 generates the drive control signal on the basis of the command rotation speed Ra input from the control command generation part 1*a*, and outputs the drive control signal to the motor drive circuit 3. The motor drive circuit 3 generates the drive signal on the basis of the drive control signal input from the control signal generation part 2*c* and supplies the drive signal to the motor M. As a result, the motor M rotates at a rotation speed corresponding to the host command rotation speed R0 input from the host control device J to the motor control device A.

In the main operation of the motor control device A, there is concern that, when the motor drive circuit 3 comes to an overloaded state by generating the drive signal on the basis of the host command rotation speed R0, the motor drive circuit 3 may be damaged due to abnormal heat generation, and in some cases, the drive signal cannot be generated due to a failure.

The operation of the main parts of the motor control device A is based on the power limitation part 1*b* of the microcomputer 1, and the voltage detection part 2*a* and the current detection part 2*b* of the motor control IC 2, detects the load power (drive load) of the motor drive circuit 3 on the basis of the load voltage detected by the voltage detection part 2*a* and the load current detected by the current detection part 2*b*, and corrects the command rotation speed Ra on the basis of a result of comparison between this load power (drive load) and a predetermined control threshold value so that the command rotation speed Ra is decreased.

Figure 2:
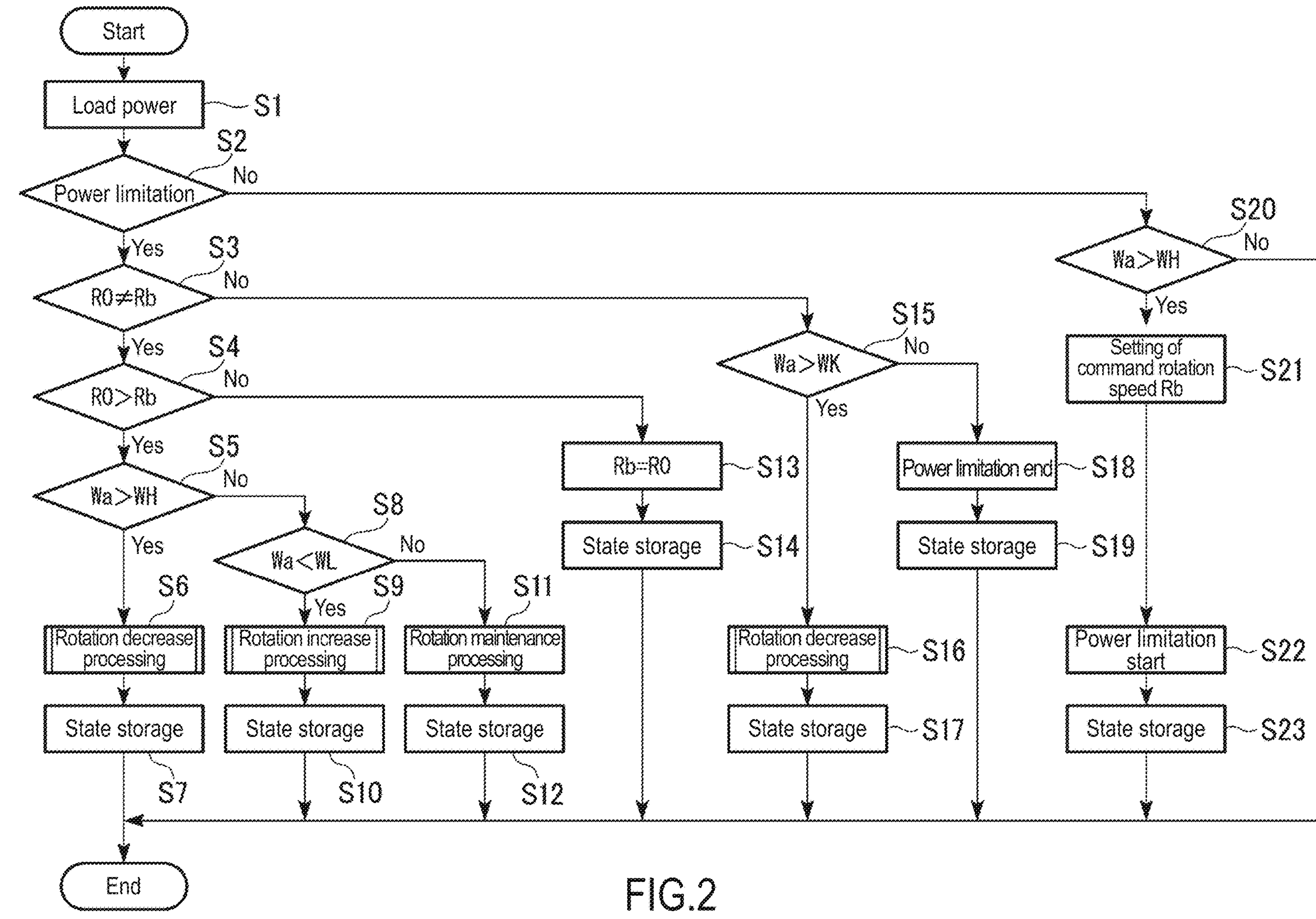
FIG. 2 is a flowchart showing a motor control method according to an embodiment of the disclosure.

In such an operation of the main parts, as shown in FIG. 2, the power limitation part 1*b* of the microcomputer 1 first detects the load power Wa (driving load) on the basis of the load voltage input from the voltage detection part 2*a* and the load current input from the current detection part 2*b* (step S1). That is, the power limitation part 1*b* calculates the load power Wa of the motor drive circuit 3 by multiplying the load voltage by the load current. This step S1 corresponds to a load power detection process in the disclosure.

The power limitation part 1*b* determines whether the motor drive circuit 3 has already been in a power limitation state (step S2). The power limitation part 1*b* includes, for example, a memory area that stores a plurality of control variables (flags) indicating a past power limitation state, and determines whether a current state is the power limitation by referring to a control variable (first flag) indicating whether or not the power limitation is performed among the plurality of control variables stored in this memory area.

When the determination result in step S2 is "Yes", that is, when the power limitation is being performed, the power limitation part 1*b* determines whether or not the host command rotation speed R0 is different from the command rotation speed Ra (step S3). When the determination result in step S3 is "Yes", the power limitation part 1*b* determines whether the host command rotation speed R0 is larger than the command rotation speed Rb during the power limitation (step S4).

When the determination result in step S4 is "Yes", the power limitation part 1*b* determines whether the load power Wa is higher than the upper limit value WH among the power limitation threshold values described above (step S5). When the determination result in step S5 is "Yes", the power limitation part 1*b* outputs the power limitation signal indicating a rotation decrease processing to the control command generation part 1*a* (step S6). This step S6 corresponds to a rotation command value correction process in the disclosure.

The rotation decrease processing is processing for correcting the command rotation speed Rb during power limitation into a rotation speed lower than the host command rotation speed R0 against the host command rotation speed R0. That is, when the power limitation in the power limitation part 1*b* is not performed, the control command generation part 1*a* generates the command rotation speed Ra equal to the command rotation speed R0, but corrects the command rotation speed Rb during power limitation into a corrected command rotation speed Rc indicating the rotation speed lower than the host command rotation speed R0 when the power limitation signal indicating the rotation decrease processing is input from the power limitation part 1*b*.

As a result, the control signal generation part 2*c* of the motor control IC 2 generates the corrected drive control signal on the basis of the corrected command rotation speed Rc and outputs the corrected drive control signal to the motor drive circuit 3. The motor drive circuit 3 generates a corrected drive signal on the basis of the corrected drive control signal and supplies the corrected drive signal to the motor M. Since this corrected drive signal decreases the rotation speed of the motor M, the load power of the motor drive circuit 3 decreases and the rotation speed of the motor M also decreases.

The power limitation part 1*b* stores an implementation state of the power limitation for the motor drive circuit 3 in the memory area when the rotation decrease processing is completed (step S7). That is, the power limitation part 1*b* stores, in the memory area, that the power limitation of the motor drive circuit 3 is being performed and that the motor drive circuit 3 is being controlled on the basis of the corrected command rotation speed Rc.

Further, when the determination result in step S5 is "No", the power limitation part 1*b* determines whether the load power Wa is smaller than a lower limit value WL in the power limitation threshold value (step S8). When the determination result in step S8 is "Yes", the power limitation part 1*b* outputs a power limitation signal indicating a rotation increase processing to the control command generation part 1*a* (step S9). This step S9 corresponds to the rotation command value correction process in the disclosure.

The rotation increase processing is processing for correcting the command rotation speed Rb during the power limitation into a rotation speed higher than the current value. That is, in a case where the load power Wa is lower than the lower limit value WL, the control command generation part 1*a* corrects the command rotation speed Rb during the power limitation into a corrected command rotation speed Rd higher than the current value when the power limitation signal indicating the rotation increase processing is input from the power limitation part 1*b*.

As a result, the control signal generation part 2*c* of the motor control IC 2 generates a corrected drive control signal on the basis of the corrected command rotation speed Rd and outputs the corrected drive control signal to the motor drive circuit 3. The motor drive circuit 3 generates the corrected drive signal on the basis of the corrected drive control signal and supplies the corrected drive signal to the motor M. Since this corrected drive signal increases the rotation speed of the motor M, the load power of the motor drive circuit 3 increases and the rotation speed of the motor M also increases.

When the rotation increase processing is completed, the power limitation part 1*b* stores the implementation state of the power limitation for the motor drive circuit 3 in the memory area (step S10). That is, the power limitation part 1*b* stores, in the memory area, that the power limitation of the motor drive circuit 3 is being performed and that the motor drive circuit 3 is being controlled on the basis of the corrected command rotation speed Rd.

Further, when the determination result in step S8 is "No", the power limitation part 1*b* outputs a power limitation signal indicating rotation maintenance processing to the control command generation part 1*a* (step S11). This rotation maintenance processing is processing for maintaining the command rotation speed Rb during power limitation at the current value. That is, when the power limitation signal indicating the rotation maintenance processing is input from the power limitation part 1*b*, the control command generation part 1*a* maintains the command rotation speed Rb during power limitation at the current value.

As a result, the control signal generation part 2*c* generates the drive control signal on the basis of the command rotation speed Rb during the power limitation and outputs the drive control signal to the motor drive circuit 3. The motor drive circuit 3 generates the drive signal on the basis of the drive control signal and supplies the drive signal to the motor M. As a result, the load power of the motor drive circuit 3 is maintained at the current value, and the rotation speed of the motor M is maintained at the current value.

When the rotation maintenance processing is completed, the power limitation part 1*b* stores the implementation state of the power limitation for the motor drive circuit 3 in the memory area (step S12). That is, the power limitation part 1*b* stores, in the memory area, that the power limitation of the motor drive circuit 3 is being performed and that the motor drive circuit 3 is being controlled on the basis of the command rotation speed Rb.

Further, when the determination result in step S4 described above is "No", that is, when the host command rotation speed R0 is equal to or lower than the command rotation speed Rb during the power limitation, the power limitation part 1*b* performs processing for applying the host command rotation speed R0 to the command rotation speed Rb (step S13). As a result, the control signal generation part 2*c* generates the drive control signal on the basis of the command rotation speed Rb (=host command rotation speed R0) during power limitation_and outputs the drive control signal to the motor drive circuit 3.

The motor drive circuit 3 generates the drive signal on the basis of the drive control signal and supplies the drive signal to the motor M. As a result, the load power of the motor drive circuit 3 is set on the basis of the host command rotation speed R0, and the rotation speed of the motor M is set on the basis of the host command rotation speed R0.

The power limitation part 1*b* stores the implementation state of the power limitation for the motor drive circuit 3 in the memory area (step S14). That is, the power limitation part 1*b* stores, in the memory area, that the power limitation of the motor drive circuit 3 is being performed and that the motor drive circuit 3 is being controlled on the basis of the host command rotation speed R0.

Furthermore, when the determination result in step S3 described above is "No", that is, when the host command rotation speed R0 is equal to the command rotation speed Rb during power limitation, the power limitation part 1*b* determines whether or not the load power Wa is higher than the release value WK among the power limitation threshold values described above (step S15). When the determination result in step S15 is "Yes", the power limitation part 1*b* outputs the power limitation signal indicating the rotation decrease processing to the control command generation part 1*a* (step S16). This step S16 corresponds to the rotation command value correction process in the disclosure.

This rotation decrease processing is similar to step S6 described above. As a result of this rotation decrease processing, the command rotation speed Rb during power limitation is corrected into the corrected command rotation speed Rc, the control signal generation part 2*c* of the motor control IC 2 generates the corrected drive control signal on the basis of the corrected command rotation speed Rc and output the corrected drive control signal to the motor drive circuit 3.

The motor drive circuit 3 generates the corrected drive signal on the basis of the corrected drive control signal and supplies the corrected drive signal to the motor M. Since this corrected drive signal decreases the rotation speed of the motor M, the load power of the motor drive circuit 3 decreases and the rotation speed of the motor M also decreases.

When the rotation decrease processing in step S16 is completed, the power limitation part 1*b* stores the implementation state of the power limitation for the motor drive circuit 3 in the memory area (step S17). That is, the power limitation part 1*b* stores, in the memory area, that the power limitation of the motor drive circuit 3 is being performed and that the motor drive circuit 3 is being controlled on the basis of the corrected command rotation speed Rc.

Further, when the determination result in step S15 described above is "No", that is, when the load power Wa is equal to or smaller than the release value WK, the power limitation part 1*b* outputs a power limitation signal indicating the end of the power limitation for the motor drive circuit 3 to the control command generation part 1*a* (step S18). As a result, the motor drive circuit 3 generates the drive signal on the basis of the host command rotation speed R0 and supplies the drive signal to the motor M, and the motor M rotates at a rotation speed based on the host command rotation speed R0.

When the processing of step S18 is completed, the power limitation part 1*b* stores the implementation state of the power limitation for the motor drive circuit 3 in the memory area (step S19). That is, the power limitation part 1*b* stores, in the memory area, that the power limitation of the motor drive circuit 3 has ended and that the motor drive circuit 3 is being controlled on the basis of the host command rotation speed R0.

Furthermore, when the determination result in step S2 described above is "No", that is, when the power limitation of the motor drive circuit 3 is not being performed, the power limitation part 1*b* determines whether the load power Wa is higher than the upper limit value WH (step S20). When the determination result in step S20 is "Yes", the power limitation part 1*b* sets the command rotation speed Rb at the start of the power limitation to a predetermined value (step S21).

The power limitation part 1*b* starts the power limitation of the motor drive circuit 3 by outputting the power limitation signal indicating the command rotation speed Rb to the control command generation part 1*a* (step S22). The control command generation part 1*a* outputs the command rotation speed Rb to the control signal generation part 2*c* of the motor control IC 2. The control signal generation part 2*c* generates the drive control signal on the basis of the command rotation speed Rb and outputs the drive control signal to the motor drive circuit 3.

As a result, the motor drive circuit 3 generates the drive signal on the basis of the drive control signal corresponding to the command rotation speed Rb and supplies the drive signal to the motor M. That is, the motor drive circuit 3 comes to a state where the load power is limited by the command rotation speed Rb. The motor M rotates at a rotation speed based on a drive signal corresponding to the command rotation speed Rb.

When power limitation start processing in step S22 is completed, the power limitation part 1*b* stores the implementation state of the power limitation for the motor drive circuit 3 in the memory area (step S23). That is, the power limitation part 1*b* stores, in the memory area, that the power limitation of the motor drive circuit 3 is being performed and that the motor drive circuit 3 is being controlled on the basis of the command rotation speed Rb. When the determination result in step S20 is "No", the power limitation part 1*b* ends the entire processing as shown in the figure.

Figure 3A:
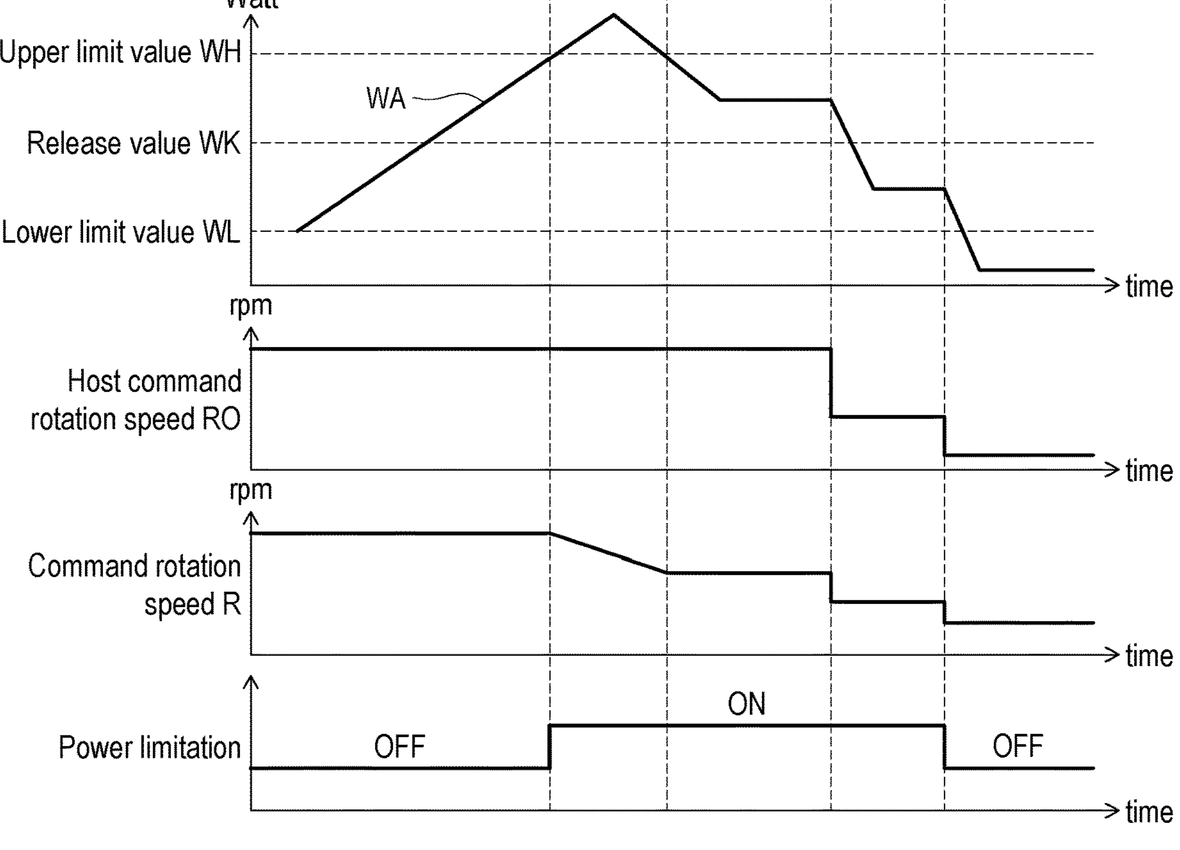
FIG. 3A and FIG. 3B are timing charts showing a motor control method according to an embodiment of the disclosure.
Figure 3B:
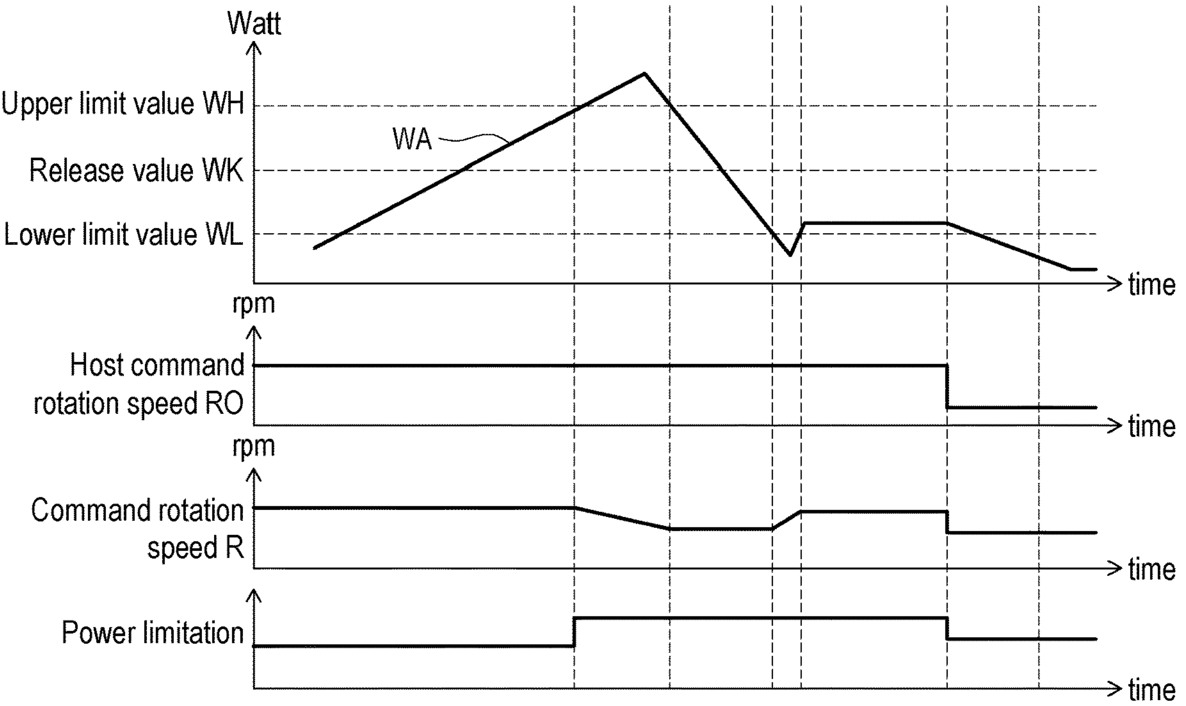

FIG. 3A and FIG. 3B are timing charts based on such a motor control method. In this timing chart, a waveform at the top shows a time-series change in the load power Wa. Further, a waveform in a second row from the top shows a time-series change in the host command rotation speed R0, and a waveform in a third row from the top shows a time-series change in the command rotation speed R. Furthermore, a waveform at a bottom indicates implementation (ON) or non-implementation (OFF) of the power limitation of the motor drive circuit 3.

As shown in the timing chart of FIG. 3A, when the load power Wa exceeds the upper limit value WH, the power limitation is implemented (ON) and the command rotation speed R decreases. Due to this decrease in the command rotation speed R, the load power Wa decreases and is lower than the upper limit value WH.

The power limitation is released when the host command rotation speed R0 lower than a current command rotation speed R is designated by the host control device J and the load power Wa is lower than the release value WK. That is, when the two conditions are satisfied, the power limitation is switched from the implementation (ON) to the non-implementation (OFF). The power limitation is released after the command rotation speed R is updated to the host command rotation speed R0.

Here, even when the load power Wa decreases and is lower than the upper limit value WH due to the decrease in the command rotation speed R, the power limitation is not immediately switched from the implementation (ON) to the non-implementation (OFF). That is, once the power limitation starts the implementation (ON), the power limitation continues to be the implementation (ON) even when the load power Wa is lower than the upper limit value WH.

The power limitation is switched from the implementation (ON) to the non-implementation (OFF) when the host command rotation speed R0 lower than the current command rotation speed R is designated by the host control device J and the load power Wa is lower than the release value WK, in addition to the load power Wa being lower than the release value WK.

Further, as shown in the timing chart of FIG. 3B, when the load power Wa is lower than the lower limit value WL during the implementation (ON) of the power limitation, the command rotation speed Ra (rotation command value) increases until the load power Wa exceeds the lower limit value WL is increased.

The motor control device A according to the present embodiment controls the motor M by supplying the drive signal generated on the basis of the command rotation speed Ra (rotation command value) by the motor drive circuit 3 (drive circuit) to the motor M, and includes the voltage detection part 2*a* configured to detect a voltage of the drive signal as the load voltage; the current detection part 2*b* configured to detect a current of the drive signal as the load current; and the power limitation part 1*b* configured to detect the load power Wa of the motor drive circuit 3 (drive circuit) on the basis of the load voltage and the load current, and decrease the command rotation speed Ra (rotation command value) when the load power Wa exceeds the predetermined upper limit value WH to perform power limitation.

In the motor control method according to the present embodiment, the motor drive circuit 3 (drive circuit) controls the motor M by supplying the drive signal generated on the basis of the command rotation speed Ra (rotation command value) to the motor M and includes a load power detection process of detecting the load power Wa of the motor drive circuit 3 (drive circuit) on the basis of the load voltage and the load current of the motor drive circuit 3 (drive circuit), and a rotation command value correction process of decreasing the command rotation speed Ra (rotation command value) when the load power Wa exceeds the predetermined upper limit value WH.

According to the present embodiment, since the voltage detection part 2*a*, the current detection part 2*b*, and the power limitation part 1*b* are included and the command rotation speed Ra (rotation command value) is operated on the basis of the load power Wa, it is possible to provide the motor control device A and the motor control method capable of performing the power limitation of the motor drive circuit 3 (drive circuit) more accurately.

Further, in the motor control device A according to the present embodiment, since the power limitation part 1*b* increases the command rotation speed Ra (rotation command value) when the load power Wa is lower than the predetermined release value WK and the lower limit value WL, it is possible to rotate the motor M in a state close to that without power limitation while accurately perform the power limitation of the motor drive circuit 3 (drive circuit).

The disclosure is not limited to the embodiment, and for example, the following modification examples can be considered.

(1) In the embodiment, a case where the disclosure is applied to control of the motor M mounted on a vehicle has been described, but the disclosure is not limited thereto. The disclosure can be appropriate for control of the motor for various uses.

(2) In the embodiment, the command rotation speed Ra (rotation command value) is increased when the load power Wa is lower than the predetermined release value WK and the lower limit value WL, but the disclosure is not limited thereto. For example, the command rotation speed Ra (rotation command value) may be increased when the load power Wa is lower than the lower limit value WL without setting the release value WK.

(3) Furthermore, the rotation increase processing (step S9) for increasing the command rotation speed Ra (rotation command value) when the load power Wa is lower than the lower limit value WL is not essential processing and may be omitted when necessary.

(4) In the embodiment, the supply voltage supplied to the motor drive circuit 3 (drive circuit) is detected as the load voltage when the motor drive circuit 3 (drive circuit) is configured as a three-phase inverter circuit, but the disclosure is not limited thereto. That is, the load voltage in the disclosure is not limited to the supply voltage.

What is claimed is:

1. A motor control device for controlling a motor by supplying a drive signal generated based on a rotation command value by a drive circuit to the motor, the motor control device comprising:

a voltage detection part configured to detect a supply voltage supplied to the drive circuit as a load voltage;

a current detection part configured to detect a current of the drive signal as a load current; and a power limitation part configured to:

calculate a load power of the drive circuit based on the load voltage and the load current, determine whether a host command rotation speed is larger than a current command rotation speed, in response to the host command rotation speed is larger than the current command rotation speed, determine whether the load power is higher than a predetermined upper limit value, and decrease the rotation command value in response to the load power exceeding the predetermined upper limit value to perform power limitation.

2. The motor control device according to claim 1, wherein the power limitation part increases the rotation command value in response to the load power being lower than a predetermined lower limit value.

3. The motor control device according to claim 1, wherein in response to the host command rotation speed being lower than the current command rotation speed, the current command rotation speed is updated to the host command rotation speed, the power limitation part ends the power limitation in response to the load power being lower than a predetermined release value, and the current command rotation speed has been updated to the host command rotation speed.

4. A motor control method for controlling a motor by supplying a drive signal generated based on a rotation command value by a drive circuit to the motor, the motor control method comprising:

a load power detection step of calculating a load power of the drive circuit based on a load voltage and a load current of the drive circuit; and a rotation decrease processing step of implementing power limitation by:

determining whether a host command rotation speed is larger than a current command rotation speed, in response to the host command rotation speed is larger than the current command rotation speed, determining whether the load power is higher than a predetermined upper limit value, and decreasing the rotation command value into a corrected rotation command value lower than a host command rotation value in response to the load power exceeding a predetermined upper limit value.

* * * * *